May 5, 1959  B. S. AIKMAN  2,885,030
APPARATUS FOR INHIBITING SIDESLIP OF AUTOMOTIVE
VEHICLES DUE TO BRAKING
Filed Oct. 29, 1956  6 Sheets-Sheet 1

Fig.1

INVENTOR.
Burton S. Aikman
BY
ATTORNEY

Fig. 2

May 5, 1959  B. S. AIKMAN  2,885,030
APPARATUS FOR INHIBITING SIDESLIP OF AUTOMOTIVE
VEHICLES DUE TO BRAKING
Filed Oct. 29, 1956  6 Sheets-Sheet 4

Fig. 6

INVENTOR.
Burton S Aikman
BY
*Aalebert A. Steinmiller*
ATTORNEY

Fig. 8

INVENTOR.
Burton S. Aikman

United States Patent Office 2,885,030
Patented May 5, 1959

2,885,030

APPARATUS FOR INHIBITING SIDESLIP OF AUTOMOTIVE VEHICLES DUE TO BRAKING

Burton S. Aikman, St. Petersburg, Fla., assignor to Westinghouse Air Brake Company, Wilmerding, Pa., a corporation of Pennsylvania Application October 29, 1956, Serial No. 618,752

16 Claims. (Cl. 188—5)

This invention relates to apparatus for inhibiting sideslip of automotive vehicles due to braking and, more particularly, to such apparatus for tractor-trailer vehicles for preventing "jackknifing" of the towed vehicle, or trailer, relative to the tractor vehicle when the vehicles are in motion. The term "jackknifing," as used hereinafter, refers to the angling of a trailer relative to its tractor, while in motion, due to a tendency of the trailer to overtake, or travel at a greater rate of speed than, the tractor.

The tendency of a trailer to overtake or overrun its tractor results from the occurrence of a wheel-slipping condition of the trailer wheels while the tractor wheels are still maintaining normal traction with the road surface. The term "wheel-slipping," as used hereinafter, may be defined as the condition prevailing when a vehicle has lost adhesive traction with the road surface, due to an excessive braking force applied to the wheel or a slippery condition of the road surface, and is rotating at a speed inconsistent with the speed of the vehicle at any given time. Such tendency of the trailer to overtake its tractor results in sideslip of the trailer and consequent jackknifing of the tractor and trailer. Therefore, as long as the degree of traction between the trailer wheels and road surface is equal to or greater than the degree of traction between the tractor wheels and the road surface, conventional braking apparatus is normally adequate for controlling retardation of the trailer correspondingly to that of the tractor.

The principal object of the invention, therefore, is to supplement conventional automotive vehicle braking apparatus with means for providing adequate road traction or friction between the trailer and the road surface to compensate for any loss of trailer-wheel traction, for preventing sideslip of the vehicle.

More specifically, another object of the invention is to provide means for preventing sideslip of the wheels of an automotive trailer, said means being capable of providing maximum retarding effect on all types of road surfaces irrespective of the tractive condition of the road surface.

Another object of the invention is to provide an apparatus for preventing sideslip of an automotive vehicle, which apparatus is adaptable to either hydraulic or air pressure operated brake systems.

Another object of the invention is to provide an apparatus for preventing sideslip of an automotive vehicle, which apparatus is operable, either manually or automatically, in phase with conventional brake apparatus provided on the vehicle.

Another object of the invention is to provide a braking apparatus for preventing sideslip of an automotive vehicle, which apparatus is adaptable to either single or multiple axle vehicles.

Figure 1:
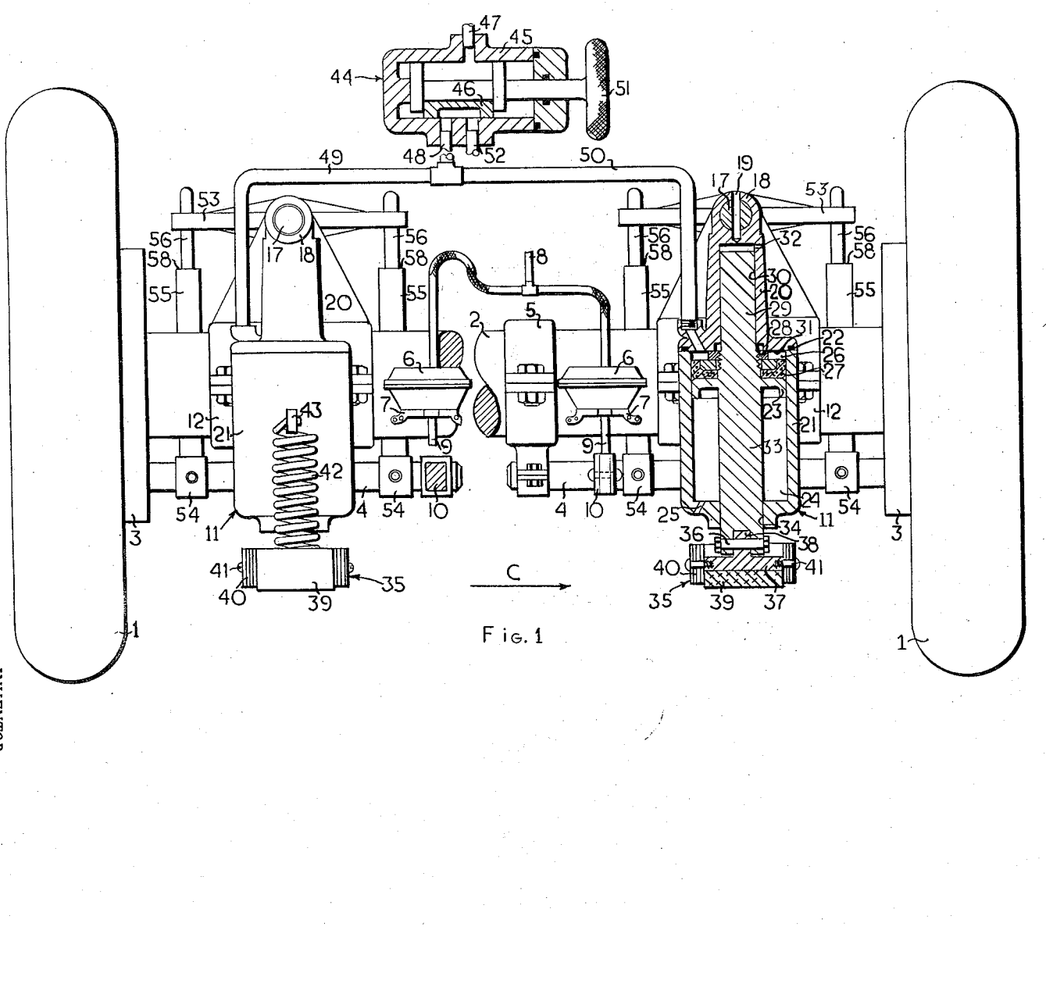
Fig. 1 is an elevational view, mostly in outline, looking toward the rear of an automotive trailer, showing one embodiment of the invention mounted on the rear trailer axle.
Figure 2:
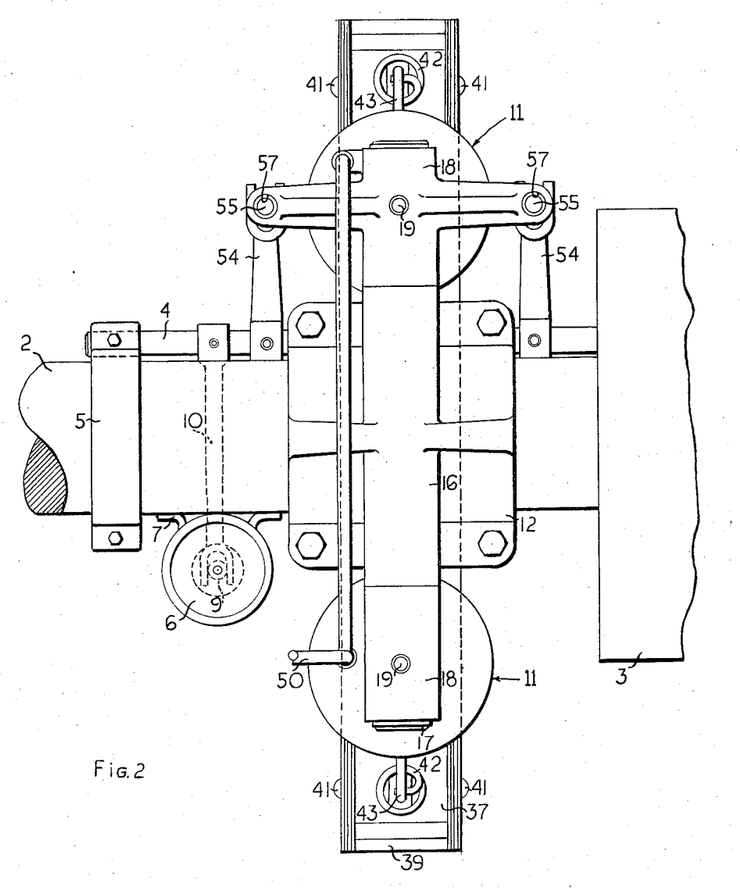
Fig. 2 is a plan view, in outline, showing a portion of the apparatus at one end of the axle shown in Fig. 1.
Figure 3:
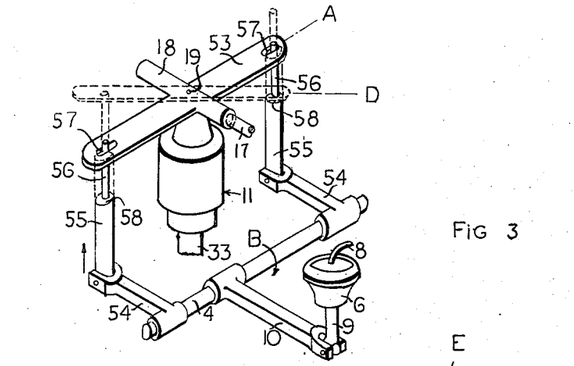
Fig. 3 is a perspective, diagrammatic view, showing details of the linkage forming part of the apparatus in Figs. 1 and 2.

Other objects and advantages of the invention will become more apparent when the following detailed description thereof is read in conjunction with the accompanying drawings wherein:

Description, Figs. 1, 2 and 3

Referring to Fig. 1, the embodiment of the invention shown illustrates how the apparatus may be applied to an automotive semi-trailer, for example, having a single axle, the apparatus in this case being controllable by a remotely situated valve device manually operable by the operator in the cab independently of any control devices associated with the conventional brakes on the vehicle.

Numeral 1 designates the trailer wheels mounted in conventional manner (not shown) for rotation on a non-rotative axle 2 with each wheel having associated therewith, in the usual manner, respective brake drums 3 rotatable with said wheels and within the drums internal expanding, self-energizing brake shoes or liners (not shown, normally biased by spring means (not shown) away from the brake drum in a brake release position. Each set of brake shoes may be actuated outwardly into frictional engagement with the interior surface of the drums, for effecting a brake application, by axial rotation of respective operating shafts 4 associated with each brake drum 3 and supported axially parallel to axle 2 by respective brackets 5 (only one of which is shown) removably secured on said axle. Rotation of the shafts 4 about their respective axes, out of a normal position in which the brake shoes are in the brake release position, is effected by respective brake actuators 6, which are supported on the axle 2 in any suitable manner, as for example, that shown in the drawing in which the actuators are mounted by brackets 7 on the axle 2 in a substantially horizontal position.

Since it is not deemed essential to an understanding of the invention, the brake actuators 6 have not been shown in detail in the drawing. Briefly, however, each of the brake actuators 6 comprises a casing having therein a diaphragm operable, in response to pressure of fluid supplied through a flexible conduit 8 and acting on one side thereof, from a normal position in which the shaft 4 is also in its normal position, to a brake applying position in which a push rod 9 movable with said diaphragm and pivotally connected to one end of a link 10 having its other end affixed to the shaft 4, causes said shaft 4 to be rotated about its axis to a brake applying position for actuating the brake shoes to effect a brake application on the wheel 1, as above described. A spring contained in the brake actuators 6 acts to return the diaphragm and push rod 9 to their normal position, upon release of fluid pressure acting on said diaphragm, for effecting a release of the brake application on the wheel 1. The conduit 8 leads to a brake control valve device 13 (shown in Figs. 4, 5 and 7) which controls the degree of fluid pressure supplied to the brake actuators 6 from a source not shown. The brake control valve device 13 is the usual pressure-maintaining type having a brake release position, in which fluid pressure supply to the brake actuators 6 is cut off to effect a release of the brakes on the wheels 1, said control valve device being manually operable by a foot pedal 14 to a brake application position to effect supply of fluid pressure to said brake actuators to effect a brake application on said wheels, the degree of fluid pressure supplied thereto, and therefore the intensity of said brake application, being proportional to the extent of movement of said foot pedal in the direction indicated by the arrow "E" in Figs. 4, 5 and 7 of the drawing. Upon release of manual pressure on the pedal 14, fluid pressure in the brake actuator 6 is exhausted to atmosphere back through the valve device 13 and through an exhaust pipe 15.

A pair of power cylinder devices 11, each pair supported by means of a bracket 12 secured to the axle 2, are carried at each end of said axle adjacent the respective inner faces of the wheels 1 in perpendicular relation to the ground. Each pair of power cylinder devices 11 straddles the respective end of the axle 2 so as to have one power cylinder suspended vertically on each side of the axle oppositely to each other as may be clearly seen in Fig. 2. The bracket 12 has integrally formed therewith a sleeve-like bearing portion 16 extending transversely over and perpendicularly to the axle 2, in which a bearing a rotary shaft 17 is carried. One power cylinder device 11 is rockably suspended at each end of the shaft 17 by means of a sleeve portion 18 formed integrally with each of said power cylinder devices, pins 19 serving to secure each of the sleeve portions 18 of the power cylinder devices 11 to the shaft 17.

Each of the power cylinder devices 11 comprises a cylindrical casing having an upper section 20, at the upper end of which the sleeve portion 18 is formed, and a lower section 21, as viewed in the drawing, said casing sections being coaxially secured to each other by suitable means not shown. An O-ring 22 may be disposed between the abutting surfaces of the two sections to form an air-tight seal. A piston 23 disposed in the lower casing section 21 cooperates with said casing section to form on the lower side of said piston a non-pressure chamber 24 vented to atmosphere by a port 25, and cooperates with the upper casing section 20 to form at the opposite side of said piston a pressure chamber 26. A sealing cup 27 is secured to the piston 23 on the side adjacent chamber 26 by a screw-threaded nut 28 screwed onto a piston stem 29 to prevent leakage of fluid under pressure from chamber 26 past said piston. The stem 29, formed integrally with piston 23, extends concentrically therefrom through the pressure chamber 26 into a coaxial guide bore 30 formed in the casing section 20, said bore being of such diametric dimension as to permit sliding contact with said piston stem and of such depth as to allow clearance between the end of said stem and the base of said bore when the piston 23 is in a normal or uppermost position, limited by engagement of the nut 28 with a shoulder 31 formed in the casing section 20 surrounding bore 30 and as shown in the drawing, in which normal position chamber 26 is vented of fluid pressure. A breather port 32 opening to atmosphere is provided near the base of bore 30 to permit freedom of movement of the piston 23. An integral piston rod 33 extends concentrically from the side of piston 23 opposite stem 29 through chamber 24 and a bore 34 formed in the base of casing section 21, to the exterior of said casing section. The piston rods 33 of each pair of power cylinder devices 11 support a brake shoe 35 which extends transversely underneath the axle 2 parallel to the road surface so as to normally allow sufficient clearance between the brake shoe and the road surface to clear any normally uneven surface or object on the highway. The brake shoe 35, which is attached adjacent each of its ends to the respective piston rods 33 by means of pins or bolts 36, as will be immediately described, is an elongated, flat-surfaced shoe having a sled-runner shape at each end to prevent hooking into any indentations in the road surface (Fig. 8) or other foreign objects lying on the roadway. As may be seen in Figs. 1, 6 and 7, the brake shoe 35 comprises a supporting member 37 having lugs 38 formed thereon for attaching the shoe to the piston rod 33 with the bolts 36. A flat brake shoe lining 39 of suitable material, such as a composition material for example, is attached by suitable means (not shown) to the entire outer surface of the supporting member 37 so as to engage the road surface upon operation of the power cylinder devices 11 as will be hereinafter described. A series of blade-like strips 40 of tempered metal or other suitable material are secured along the entire length of each side of the brake shoe 35 by means of screws 41, for example, the lower edges of said strips being just slightly above the road-engaging surface of the lining 39 for a purpose to be hereinafter explained. In order to provide traveling clearance between the shoes 35 and the roadway, when said shoes are not in use, each of the brake shoes, as well as the pistons 23 of the respective pair of power cylinders 11, are biased upwardly by a pair of coil springs 42, one at each end of the shoe, toward a normal position as determined by the normal position of said pistons, as above described. Each coil spring 42 is fastened at one end to the brake shoe 35 and at the other end to a lug 43 formed on the outer surface of the casing section 21.

In the embodiment of the invention, as illustrated in Fig. 1, a manually operable control valve device 44, which is situated within reach of the vehicle operator in the cab, is provided for controlling supply and exhaust of fluid under pressure to and from, respectively, the pressure chambers 26 of the power cylinder devices 11. The valve device 44, for purposes of illustration, may comprise simply a casing 45 in which a slide valve 46 is effective in a release position, in which it is shown in the drawing, for disconnecting communication between a conduit 47, leading from a source of fluid under pressure not shown, and a conduit 48 connecting with branches 49 and 50 leading to the respective pressure chambers 26 of each pair of power cylinder devices 11. In its release position, the slide valve 46 further connects conduit 48 to an atmospheric exhaust conduit 52 for releasing fluid pressure from pressure chambers 26. The slide valve 46 is operable by a handle 51 to a supply position in which supply from conduit 47 is connected to conduit 48, and the latter is disconnected from atmospheric exhaust conduit 52 for effecting supply of fluid pressure to the pressure chambers 26.

One of the sleeve portions 18 of each pair of power cylinders 11 is provided with a yoke 53 formed integrally with said sleeve portion and extending perpendicularly from each side thereof, said yoke normally occupying a horizontal position, indicated as "A" in Fig. 3. The yokes 53 are provided on the sleeve portions 18 that are on the same vertical side of the axle 2 as the side on which the operating shaft 4 is located in order to provide a linkage connection between said yokes and said shaft as will be immediately described and as are more clearly shown in Fig. 3. For each yoke 53 there is a pair of arms 54, each secured at one end to the operating shaft 4 and normally extending perpendicularly thereto and substantially horizontally so as to have the free end thereof, formed as a clevis, situated directly underneath the two extremities of the yoke 53. Each arm 54 has an upright rod 55 pivotally pinned, at its lower end, in the clevis of the respective arm 54, each of said rods having a reduced diameter portion 56 at the upper end which extends loosely through an elongated slot 57 in the respective end of the yoke 53 for limited vertical movement, as well as limited lateral movement, therein, said vertical movement being limited by rotation of the shaft 4 in a manner to be hereinafter described. A shoulder 58 formed at the junction of the reduced portion 56 with the other portion of the rod 55 is engageable by the yoke 53 which exerts a force thereon for a purpose to be later described.

*Operation, Figs. 1, 2, and 3*

Since the braking apparatus associated with the right-hand wheel 1, as viewed in Fig. 1, and embodying the invention is similar both in structure and function to the apparatus associated with the left-hand wheel 1, operation of the apparatus associated with the right-hand wheel only, as illustrated in Figs. 1, 2 and 3, will be described, it being understood that the apparatus associated with the left-hand wheel functions in a similar manner. Assuming that a tractor-trailer vehicle, equipped with braking apparatus as illustrated in Fig. 1, is traveling on a roadway, should the operator of the vehicle desire to effect a braking action on the wheel 1, he manually operates the brake valve device 13 to supply fluid pressure to the brake actuator 6 by way of conduit 8, as above described. Fluid under pressure thus supplied to the brake actuator 6 effects downward movement, as viewed in Figs. 1 and 3 of the drawing, of the push rod 9 to cause rotation of the arm 10 and shaft 4 about the axis of said shaft, as indicated by the arrow "B" in Fig. 3, to effect a brake application on the wheel 1, as above described. Assuming that no wheel-slipping occurs during such time that the wheel brakes are thus applied, and that the operator of the vehicle desires to release the wheel brakes, he merely releases manual pressure on the pedal 14 of the brake valve device 13 to effect release of fluid pressure in the brake actuator 6 by way of the exhaust pipe 15 and thereby allow the push rod 9, the arm 10 and the shaft 4 to be rotated in a direction opposite to that indicated by arrow "B" in Fig. 3, by a return spring (not shown) in the brake actuator 6. It will be noted that when a brake application is effected, and the shaft 4 is rotated in the direction indicated by the arrow "B" in Fig. 3, the reduced diameter portions 56 of the rods 55 are, in effect, moved upwardly, as viewed in Figs. 1 and 3, through the slots 57 in the yoke 53. Since the maximum amount of rotation of the shaft 4, during brake application, is determined by engagement of the brake shoes inside the brake drum 3, the reduced portions 56 of the rods 55 will move upwardly through the slots 57 only to the extent that the shaft 4 rotates. The shoulders 58 on the rods 55 are so located thereon as to not engage the yoke 53 when the rods 55 move upwardly through the slots 57 during normal braking action, but to stop just short of the yoke.

Assuming that, due to an excessive retarding force thereon, the trailer wheel 1 slips and loses adhesive traction with the road surface so as to assume a rate of speed inconsistent with that of the vehicle; under such condition "jackknifing" is apt to occur. To correct such a situation, the operator of the vehicle operates the control valve device 44 to move the valve 46 to its supply position in which fluid under pressure is supplied to pressure chambers 26 of the power cylinder devices 11, as above described. Fluid pressure in chamber 26 effects downward movement of the brake shoe 35 to engage the road surface, by operating the pistons 23 and piston rods 33 downwardly, as viewed in the drawing. With the elongated brake shoe 35 dragging on the road surface, any tendency of the trailer to slip sidewardly is averted by the frictional engagement of said shoe with the roadway, and the trailer is maintained in a direction of travel corresponding to that of the tractor vehicle. Upon resumption of vehicle speed by the wheel 1 and the elimination of the danger of sideslip, the operator may then operate the valve device 44 to return the slide valve 46 to its release position for cutting off supply of fluid under pressure to the power cylinders 11 and for releasing any fluid pressure in chambers 26 to atmosphere by conduit 52 of the valve device 44, as above described.

With the shoe 35 engaged with the road surface, should the trailer overcome the friction between the shoe and road surface and slip sidewise in the direction of arrow C (Fig. 1), for example, such sideward motion of the trailer will cause rocking or rotation of the power cylinder devices 11, in a clockwise direction as viewed in Fig. 1, about the axis of the shaft 17.

It will be recalled that the lower edges of the blades 40 attached to each side of the brake shoes 35 are so arranged as to be positioned slightly above the brake shoe lining 39 relative to the road surface so as to clear the road surface when said shoes are dragging on the road surface and when the power cylinder devices 11 are in a normal vertical position. With the power cylinder devices 11 rotated, or in an off-vertical position relative to the road surface, as above described, the sharp edges of the blades 40 on the right-hand side of the shoe 35, as viewed in Fig. 1, will engage with and drag on the road surface to retard and minimize any further sideslip of the trailer vehicle.

When the power cylinder devices 11 are rotated from their normal vertical position, as above described, the yoke 53 is also correspondingly rotated about the axis of the shaft 17 in a clockwise direction, as viewed in Fig. 1, toward a brake releasing position schematically indicated in a broken line in Fig. 3, and designated by the line marked "D." It will be recalled that when fluid pressure is supplied to the brake actuator 6 to effect a brake application on the wheel 1, the rods 55 are moved upwardly through the slots 57 to a point just short of having the shoulders 58 contact the yoke 53. Upon rotation of the yoke 53, however, as above described, said yoke will engage the shoulder 58 of the right-hand rod 55, as viewed in Fig. 3, and move said rod downwardly against the opposing force of fluid pressure in the brake actuator 6 acting through the rod 9, arm 10, shaft 4 and arm 54, to cause rotation of shaft 4 in the direction opposite to that indicated by the arrow B, and thereby effect release of the brakes on the wheel 1. It should be understood that should the trailer slip sidewise in a direction opposite to that indicated by the arrow "C" in Fig. 1, the power cylinders 11 would be rotated counter-clockwise, and the left-hand rod 55 would be moved downwardly by rotation of the yoke 53 in a counter-clockwise direction to produce similar results in effecting release of the brakes on the wheel 1. With the brakes released on the wheel 1 in the manner just described, slipping of the wheel is terminated, and the wheel may then resume traction with the road surface and regain vehicle speed. The brake shoe 35, dragging on the road surface, will serve to align the trailer with the direction of travel, upon which alignment the power cylinder devices 11 and the yoke 53 will resume their normal vertical positions to relieve the force acting on the rods 55. Assuming that fluid pressure has been maintained in the brake actuator 6 by the operator, the shaft 4 will again be rotated in the direction indicated by the arrow B in Fig. 3 to reapply the brakes on the wheel 1. With the vehicle righted, the operator may then operate the valve device 44 to its release position for retracting the brake shoes 35, and he may operate the brakes on the wheel 1 at his discretion.

Figure 4:
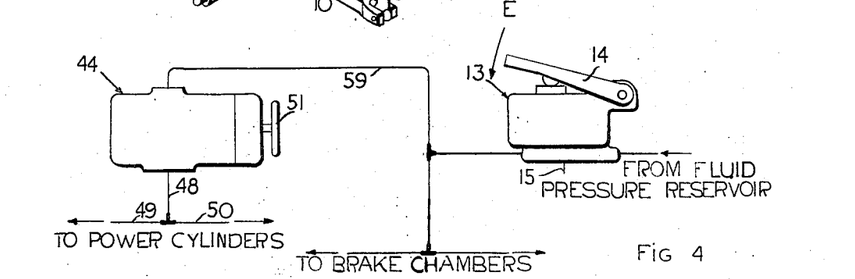
Fig. 4 is a schematic view illustrating one method for connecting the control valves with the fluid pressure lines.

*Description and operation, Fig. 4*

Fig. 4 schematically illustrates a different method of arranging the control valve device 44 relative to the brake control valve device 13. Instead of having the device 44 connected directly to the source of fluid under pressure, as is the case in the embodiment of the invention illustrated in Fig. 1, the brake control device 13 is interposed between the device 44 and the source of fluid under pressure. A branch conduit 59, taken off conduit 8 leading from valve device 13 to the brake actuators 6, connects the valve device 13 with the valve device 44.

In operation, the presently described arrangement of the valve device 44 relative to the control device 13 differs only in the respect that said control device 13 must first be operated to effect supply of fluid under pressure to the brake actuators 6 and therefore to branch conduit 59 in order to render the valve device 44 effective, when operated as above-described in case of threatened or actual sideslip of the trailer, to supply fluid under pressure by way of conduits 48, 49 and 50 to the power cylinders 11. The power cylinders 11, along with the associated apparatus, will operate in a manner similarly above described to either prevent or correct the sideslip situation.

Figure 5:
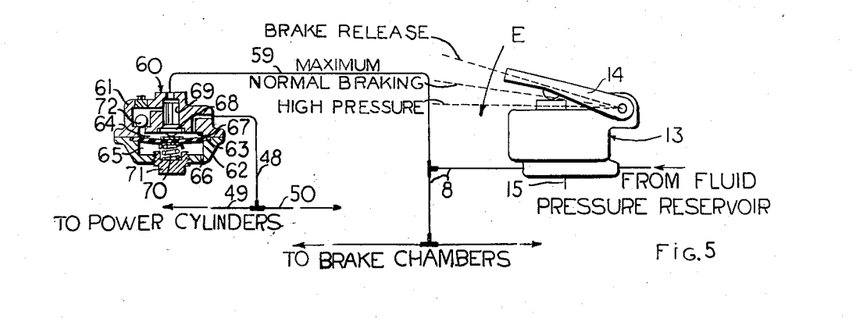
Fig. 5 is a schematic view showing still a further method for connecting the control valves with the fluid pressure lines.

*Description and operation, Fig. 5*

The arrangement as represented schematically by Fig. 5 is somewhat similar to that shown in Fig. 4 except that an automatically operative valve device 60 is interposed between conduits 59 and 48 instead of the manually operable valve device 44.

The valve device 60, for purposes of illustrating the invention, may comprise a casing section 61 secured (by suitable means not shown) to a casing section 62, having secured therebetween about its outer edge a diaphragm 63. The diaphragm 63 cooperates with casing section 61 to define a fluid pressure chamber 64 at one side of said diaphragm, while cooperating with casing section 62 to define a non-pressure chamber 65 at the opposite side of said diaphragm open to atmosphere through a breather port 66 in casing section 62. A passageway 67 formed in casing section 61 connects chamber 64 to conduit 48.

A poppet type valve 68 having a fluted stem slidably operable in a bore 69 in casing section 61 is normally biased toward a seated position in which communication between chamber 64 and conduit 59 is cut off, but is operable to an unseated position in which chamber 64, and therefore conduit 48, is placed in communication with conduit 59. A spring 70 under compression in chamber 65 and acting through diaphragm 63 serves to bias valve 68, which rests against the diaphragm 63 adjacent chamber 64, toward its seated position. An adjusting screw-nut 71 is provided in casing section 61 for adjusting the compression on spring 70 for a purpose to be hereinafter described. A one-way check valve 72 arranged in casing section 61 permits back flow and exhaust of fluid pressure from chamber 64 past valve 68 in a manner to be presently described.

In operation, let it be assumed that spring 70 has been adjusted by the screw-nut 71 to a predetermined degree of compression, as determined by the degree of fluid pressure required by the brake actuators 6 for effecting a maximum braking effort on the wheels 1, which compression acts to hold valve 68 in its seated position, above described, during normal braking operation of the wheels 1 as effected by operation of the brake valve device 13 through the foot pedal 14. Movement of the foot pedal 14 from a position indicated schematically in Fig. 5 of the drawing by a broken line as "Brake Release," in which the brakes on wheels 1 are released, through a normal brake-applying range up to a position indicated schematically by a broken line as "Maximum Normal Braking," effects supply of fluid to the brake actuators 6 through conduit 8, at a pressure proportional to the amount of movement of said foot pedal, at the same time effecting supply of fluid under pressure to the upper side of valve 68 in the device 60 by way of branch 59. Fluid pressure thus supplied to the upper side of valve 68 by operation of the brake valve device 13 through the range from "Brake Release" position to the "Maximum Normal Braking" position is inadequate for overcoming the opposing force of spring 70 acting to keep said valve seated.

If, while the tractor-trailer vehicle is traveling on the highway or during such time that the operator of the vehicle is effecting a brake application on the wheels 1 by operating the brake pedal 14 of the control valve device 13 within the normal brake-applying range above-described, there is a tendency for sideslip to occur, or sideslip of the trailer actually does occur, the operator may depress the foot pedal 14 beyond the "Maximum Normal Braking" position to what may be called a "High Pressure" position (indicated schematically by a broken line in Fig. 5 of the drawing), in which the pressure of fluid then supplied through the control valve device 13 to the upper side of valve 68 of the device 60 is sufficient for overcoming the opposing force of spring 70 and therefore unseat valve 68 to permit fluid under pressure to flow past the unseated valve into chamber 64. Fluid pressure present in chamber 64 will act over the entire area of diaphragm 63 to maintain spring 7 depressed until such time that fluid pressure in said chamber is reduced to a degree at which spring 70 is again effective to reseat valve 68.

With valve 68 unseated, conduit 48, and consequently conduits 49 and 50 are placed in communication with supply conduit 59, to allow fluid under pressure to be supplied to the power cylinder devices 11, which operate in the manner above described to prevent or correct sideslip as the case may be.

With the trailer ehicle righted, the operator may then let up on the foot pedal 14 either completely to allow it to return to its brake release position or partly to allow it to return within the normal brake-applying range. In either case, the pressure in chamber 64, and consequently in the power cylinder devices 11, will have been sufficiently reduced by way of check valve 72, reversely through conduits 59 and 8, and by way of exhaust pipe 15, so that the force of spring 70 will again be effective to reseat valve 68 to cut off further supply of fluid pressure to the power cylinder devices 11.

Practically any amount of fluid under pressure remaining in chambers 26 of the power cylinder devices 11, after the foot pedal 14 has been restored to a position within the normal brake-applying range, will maintain the brake shoe 35 engaged with the road surface to assist the wheel brakes in retarding the vehicle. Should the operator of the vehicle deem it unnecessary for the brake shoe 35 to assist in retarding the vehicle after the sideslip condition has been corrected, he may effect return of the brake shoe 35 to its normal position by releasing pressure on the foot pedal 14 to permit said pedal to return to its brake release position, in which position all fluid pressure in chambers 26 of the power cylinder devices 11 will be exhausted to atmosphere by way of conduit 48, chamber 64 of the valve device 60, check valve 70, conduits 59 and 8, and exhaust pipe 15 of the control valve device 13. The spring 42 will then be effective for returning the brake shoe 35 to its normal position. The operator of the vehicle may then resume wheel braking, without effecting any movement of the brake shoe 35, by operating the foot pedal 14 to a position within the normal braking range, for the spring 70 will maintain valve 68 seated to prevent further supply of fluid pressure to the power cylinder devices 11 until said foot pedal is again operated to the "High Pressure" position in the manner above described.

Figure 6:
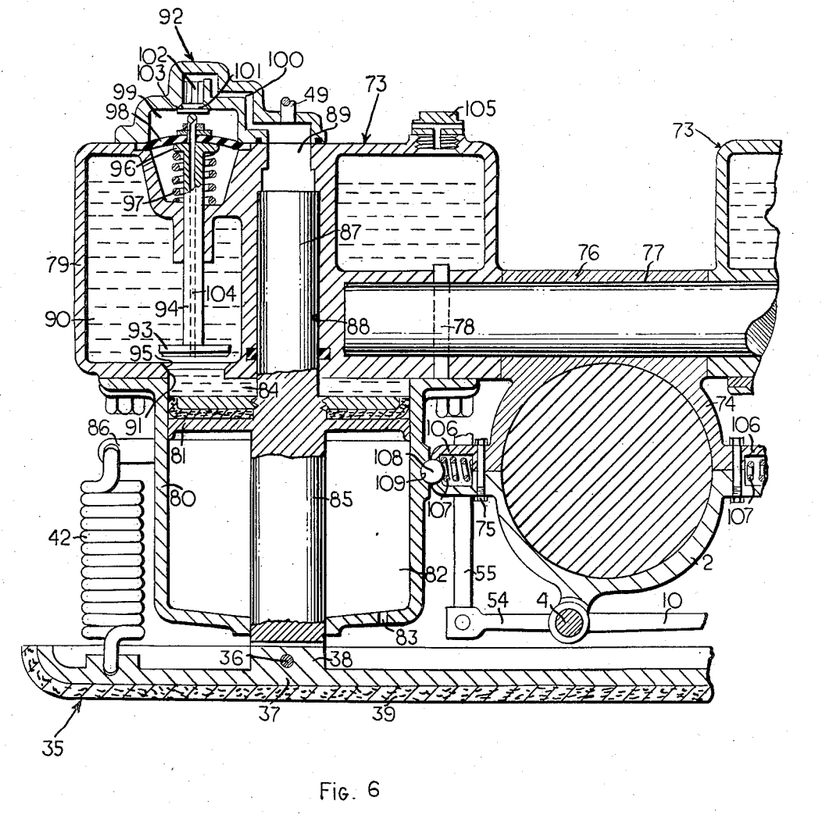
Fig. 6 is an elevational view, mostly in section, of another embodiment of the invention, looking toward the inboard side of the trailer wheels.

*Description, Fig. 6*

Fig. 6 illustrates another modification of the invention whereby hydraulic fluid is combined with pneumatic fluid under pressure to provide a means for economizing the amount of fluid under pressure needed to provide the operating force for a pair of power cylinder devices 73 located at each end of the axle 2, only one of said power cylinder devices and a portion of another being shown in Fig. 6 of the drawing since all said power cylinder devices are similar in structure and operation, and therefore only one of said power cylinder devices will subsequently be described, it being understood that instead of the power cylinder devices 11, a pair of said power cylinder devices 73 is connected to each of the branch conduits 49 and 50, and that the respective power cylinder devices 73 of each pair are arranged on opposite sides of said axle in a manner similar to that above described in connection with the embodiment shown in Figs. 1 and 2 of the drawings.

Each pair of power cylinder devices 73 is supported on the axle 2 normally in a vertical position relative to the road surface by a removably secured split bracket 74 held to the axle by bolts 75. The bracket 74 has a sleeve or bearing portion 76 in which a supporting shaft 77 is rotatably carried above the axle 2 and perpendicular thereto, said shaft having end portions extending beyond each end of the bearing portion 76. Each projecting end portion of the shaft 77 has fixedly supported thereon one of the power cylinder devices 73 by a pin 78 or other suitable means whereby the power cylinder device 73 is rigidly fixed to the shaft 77 for rotation therewith for a purpose to be hereinafter described.

The power cylinder device 73 comprises a casing of two general sections, one being a hydraulic fluid storage section 79, the other being a piston carrying section 80. The piston carrying section 80 of the power cylinder device 73 is provided with a brake-shoe operating piston 81 which cooperates with the casing section 80 to form on one side of said piston a non-pressure chamber 82 open to atmosphere by a port 83. The piston 81 cooperates with casing section 79 to define a pressure chamber 84 at the side of said piston opposite non-pressure chamber 82. A piston rod 85 extends concentrically from piston 81 through chamber 82 to the exterior of casing section 80 where it is fastened to lug 38 of the brake shoe 35 by the pin 36. Casing section 80 is also provided with a lug 86 to which the spring 42 is anchored for normally maintaining the brake shoe 35 disengaged from the road surface as above described.

The piston 81, on the side adjacent pressure chamber 84, has connected thereto and movable therewith a piston 87 of smaller diameter than said piston 81, said piston 87 being slidably operable within a bore 88 formed in casing section 79. The pressure head of piston 87 is open to a chamber 89 defined by said piston and casing section 79, to which chamber fluid under pressure may be supplied by way of the branch pipe 49.

The casing section 79 encloses a chamber 90 in which a supply of hydraulic fluid is stored and which chamber is normally in communication with pressure chamber 84 by way of an opening 91 between the casing sections 79 and 80. Opening or closing of communication between chambers 84 and 90 through opening 91 is controlled by a valve mechanism 92.

The valve mechanism 92 comprises a valve 93 at one end of a stem 94, said valve 93 normally occupying an unseated position, in which communication between chambers 84 and 90 is open, but being adapted, as will later be explained, to seat on a valve seat 95 surrounding opening 91, in which seated position said communication is closed. The valve stem 94 is provided, adjacent the end opposite valve 93, with a diaphragm follower 96 against which a spring 97 acts and, therefore, through said stem biases the valve 93 toward its unseated position. A diaphragm 98, which is anchored about its periphery in the casing section 79, is centrally fastened to the diaphragm follower 96, said diaphragm being constantly subjected on one side to the action of spring 97 and subjectable on the opposite side to pressure of fluid which may be admitted to a chamber 99 which is defined by said diaphragm and a portion of casing section 79. Admission and release of fluid under pressure to and from, respectively, chamber 99 by way of a passageway 100 leading to conduit 49, is controlled by a valve 101 having a fluted valve stem 102, said valve being engaged by the end of valve stem 94 adjacent diaphragm follower 96 and thereby normally held in a seated position against a valve seat 103 formed in the casing portion of the valve mechanism 92, in which seated position of said valve communication between said passageway and said chamber is closed. Valve 101 is operable, as will hereinafter be described, to an unseated position in which fluid under pressure may flow from passageway 100 past the fluted valve stem 102 into chamber 99. Valve stem 94 is provided with a substantially axially extending restricted passageway 104 constantly connecting chamber 99 with chamber 84.

A filler plug 105 with a vent port is provided in casing section 79 for replenishing the supply of hydraulic fluid when necessary.

The power cylinder devices 73, as illustrated in Fig. 6 of the drawings, are connected with linkage similar to that as shown in Figs. 1, 2 and 3, only a portion of which linkage is shown including the rod 55, arm 54, shaft 4 and link 10, it being understood that the linkage, though not completely shown, is connected in similar manner to the power cylinder devices 73, to the brake drum on the vehicle wheel and to the brake actuator 6 to function in a manner similarly above described in connection with the embodiment shown in Figs. 1, 2 and 3.

In order to prevent excessive movement of the power cylinder devices 73, when not in operation, a detent arrangement is provided comprising a cup-like portion 106 formed on the bracket 74 adjacent the casing section 80. A spring 107 is compressed between the base of the cup-like portion 106 and a ball 108 which partially protrudes through an opening in said cup-like portion to engage a correspondingly situated recess 109 in casing section 80 of the power cylinder device 73. The recess 109 is so arranged as to permit the ball 108 to ride out of said recess when the power cylinder device 73 rocks out of its vertical position about the axis of shaft 77 (as will later be explained) and to re-enter said recess when said power cylinder device returns to its normal vertical position.

*Operation, Fig. 6*

In operation, let it be assumed that the operator of the vehicle desires to either prevent sideslip of the trailer, which is on the verge of occurrence, or to correct and eliminate sideslip which may already be in progress. He will effect supply of fluid under pressure to conduit 49 in one way or another, as above described, depending upon which one of the various set-ups, as disclosed in Figs. 1, 4 and 5, relating to the controls for effecting supply of fluid under pressure to said conduit, the brake control apparatus is equipped with.

Fluid pressure thus supplied to conduit 49, and therefore to chamber 89, will be effective on piston 87 for moving said piston, and consequently piston 81, downwardly, as viewed in the drawing, until the brake shoe 35 is engaged with the road surface, but, as yet, not so effectively as to check sideslip. As piston 81 moves downwardly, hydraulic fluid from storage chamber 90 will flow past the unseated valve 93 into the expanding volume of chamber 84 until the piston 81 has reached the limit of its stroke determined by engagement of the shoe 35 with the road surface.

Fluid under pressure from conduit 49 will flow through passageway 100 to the upper side of valve 101, as viewed in the drawing, to unseat said valve against the opposing force of spring 97. Unseating of valve 101 will permit fluid under pressure to flow past fluted valve stem 102 and said valve to chamber 99 whereby the pressure of said fluid will be effective over the entire area of diaphragm 98 to effect downward movement of said diaphragm and therefore of stem 94 to seat valve 93. Seating of valve 93 will stop further flow of hydraulic fluid through opening 91.

In the meantime, from the moment that fluid under pressure is present in chamber 99, said fluid under pressure will flow at a restricted rate through passageway 104 in valve stem 94. Until valve 93 is firmly seated on valve seat 95, fluid under pressure reaching the under side of valve 93 will flow back through the hydraulic fluid and out through the vented filler plug 105. When valve 93 is firmly seated, however, fluid under pressure flowing through passageway 104 will act through the hydraulic fluid in pressure chamber 84 on piston 81 to apply a more effective force on the brake shoe 35 in engagement with the road surface. It is thus observed that with chamber 84 substantially filled with incompressible hydraulic fluid, it will require a greatly reduced amount of fluid under pressure, acting through said hydraulic fluid, to apply an effective force on the brake shoe 35 through piston 81, than would otherwise be necessary if said chamber were void of hydraulic fluid.

In the event of sideslip already in progress when the operator moves to correct such sideslip, the brake shoes 35, dragging on the road surface, as earlier above described, will be effective for checking further sideslip and will cause rocking of the power cylinder device 73 from its vertical position and about the axis of shaft 77 to cause downward movement of rod 55 and therefore rotation of shaft 4 to release the brakes on wheels 1 (not shown), in a manner similarly above described in connection with the embodiment shown in Fig. 1. With the wheels 1 free to rotate, the shoes 35 will be effective to bring the trailer into straight-line travel once more, and the power cylinder devices 73 will return to their normal vertical positions. Upon termination of sideslip and with the trailer righted to the proper direction of travel, the operator may release fluid pressure from conduit 49, and therefore chambers 89 and 97, in a manner similar to that described in connection with one or another of the set-ups illustrated in Figs. 1, 4 or 5 for controlling supply and release of fluid under pressure to and from the conduits 49 and 50.

Reapplication of the brakes on the wheels 1, after the power cylinder devices 73 have returned to their normal vertical positions, depends upon whether the apparatus is equipped with independently operable control devices 13 and 44, as described in connection with Fig. 1, or with interdependently operable devices 13 and 44, as described in connection with Fig. 4, or with interdependently operable devices 13 and 60, as described in connection with Fig. 5 of the drawings.

Figure 7:
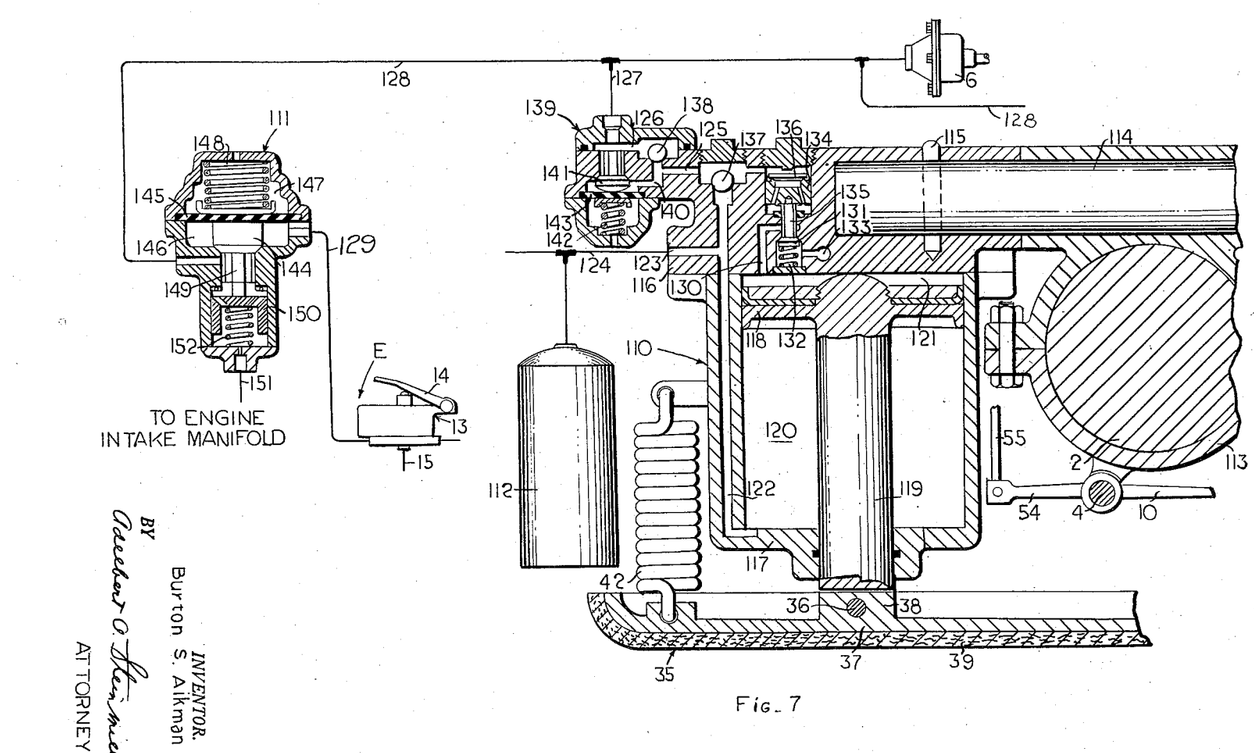
Fig. 7 is an elevational view, mostly in section, of still another embodiment of the invention, and also looking toward the inboard side of the trailer wheels.

*Description, Fig. 7*

Fig. 7 illustrates still another embodiment of the invention whereby the principle of vacuum is employed to assist in operation of still another form of power cylinder devices 110, the intention being to economize on the amount of fluid under pressure necessary for operating said power cylinder devices and the brake apparatus by utilizing atmospheric pressure.

The apparatus, as illustrated schematically in Fig. 7, comprises the brake actuators 6 (only one of which is shown), the manually operable brake control valve device 13, a selector valve device 111, a vacuum reservoir 112, the power cylinder devices 110 (only one of which is shown), and the brake shoes 35 (only one of which is shown).

A pair of the power cylinder devices 110 is carried at each end of the axle 2 by respective brackets 113 (only one being shown) with an axially rotatable shaft 114 passing through a sleeve portion of said bracket, from which shaft said power cylinder devices are suspended and secured by means of a pin 115 for rocking movement therewith. Each of said pairs of power cylinder devices are arranged relative to the axle 2 in a manner similar to that described in connection with the embodiments shown respectively in Figs. 1 and 6 of the drawings.

The power cylinder device 110 (only one of which is shown and will be described since the others are similar in structure and function) comprises two casing sections 116 and 117. A piston 118 is slidably operable within the casing section 117, and has a piston follower 119 that extends from the lower side of said piston, as viewed in the drawing, through a chamber 120 defined by the lower side of said piston and casing section 117, to the exterior of said casing section. Attached as by a pin 36 at the outer end of follower 119, in the usual manner heretofore described, is the brake shoe 35. A chamber 121 is defined by casing sections 116 and 117 and piston 118 at the side of said piston opposite chamber 120.

Chamber 120 is open to a passageway 122 formed in casing sections 116 and 117, while a branch passageway 123 formed in said casing section 116 connects the vacuum reservoir 112, through a pipe or conduit 124, to said passageway 122. Passageway 122 may be connected through a series of passageways 125, 126, also formed in casing section 116, and by way of a branch pipe or conduit 127, to a fluid pressure conduit 128 leading to the brake actuators 6 from the selector valve device 111, which is interposed between said conduit 128 and a fluid pressure conduit 129 leading from the manually operable brake control valve device 13.

Chamber 121 is open to a passageway 130, formed in casing section 116, leading to one side of a poppet type valve 131 which is normally held seated by a spring 132 to close said passageway, and therefore chamber 121, to an atmospheric port 133 open to the opposite side of said poppet valve. The passageway 130 may also be connected to the conduit 128 through a piston-valve 134 interposed between said passageway 130 and passageway 125 and carried by a valve stem 135 associated with the poppet valve 131 for movement therewith. The piston-valve 134 is provided with a one-way valve 136 which permits flow from passageway 130 to passageway 125 but seats on the piston-valve 134, in response to fluid pressure acting on the side of said one-way valve adjacent passageway 125, to prevent reverse flow.

A one-way ball-type check valve 137 is interposed between passageways 122 and 125 to permit flow from the former to the latter but prevents reverse flow, and a one-way ball-type check valve 138 is interposed between passageways 125 and 126 to permit flow from the former to the latter, but to prevent reverse flow.

A pilot valve device 139 located in casing section 116 permits fluid under pressure from conduit 128, branch 127 and passageway 126 to bypass check valve 138 and to be supplied to a passageway 140 connecting with passageway 125 and therefore with the adjacent side of valve 136. A poppet-type valve 141, normally held seated by a spring 142 acting through a diaphragm 143, acts in such seated position to close communication between passageways 126 and 140 and, when unseated, to establish said communication. The degree of fluid pressure necessary in passageway 126, and therefore acting on the adjacent side of valve 141, to unseat valve 141 is determined by the spring 142, as will hereinafter be explained.

The selector valve device 111, which is interposed between the conduits 128 and 129, is provided with a poppet-type valve 144 for controlling communication between said conduits, with conduit 128 opening to one side of said poppet valve, while conduit 129 opens to the other side. The poppet valve 144 is carried by and movable with a flexible diaphragm 145 secured between two casing sections of the selector valve device 111, said diaphragm cooperating with said casing sections to define at one side of said diaphragm a chamber 146, in which said poppet valve is disposed and into which conduit 129 opens, and at the opposite side of said diaphragm a chamber 147, in which a spring 148 is disposed to act through said diaphragm to normally maintain said poppet valve in a seated position in which communication between conduits 128 and 129 is closed, said poppet valve being movable with said diaphragm (in a manner to be hereinafter described) to an unseated position to establish said communication. The force of spring 148 is sufficient for maintaining valve 144 seated in the absence of fluid pressure in chamber 146.

Poppet valve 144 has associated therewith a fluted stem 149 having abutting contact with a piston-valve 150, said stem being of sufficient length to operate said piston-valve to an open or unseated position, when said poppet valve is in its seated position, to establish a communication between conduit 128 and a conduit 151 leading to the intake manifold (not shown) of the engine of the tractor vehicle. A spring 152 acting on one side of piston-valve 150 serves to operate said piston-valve to a closed or seated position, in which position communication between conduit 128 and conduit 151 is closed when valve 144 is operated to its unseated position, it being necessary that the force exerted by said spring on said piston valve be of such value as to hold said piston-valve in its seated position against any opposing force exerted by the vacuum in the engine intake manifold by way of conduit 151 and any opposing force of fluid, at any pressure as supplied to operate brake actuator 6, acting on the opposite side of said piston-valve when valve 144 is unseated, as will hereinafter be explained.

*Operation, Fig. 7*

In operation, let it be assumed that the tractor-trailer vehicle, equipped with the apparatus as illustrated in Fig. 7 of the drawings, is traveling under normal driving conditions, and that the brake control valve device 13 is in its brake release position, in which position fluid pressure is absent from chamber 146 of the selector valve device 111. With this condition existing, spring 148 will be effective for maintaining valve 144 seated, to cut off communication between conduits 128 and 129, and piston valve 150 unseated to open conduit 128 to vacuum conduit 151 leading to the engine intake manifold. Conduit 128, therefore, may act either as a fluid pressure supply conduit, when control valve device 13 is in its brake application position, or as a vacuum conduit when control valve device 13 is in its brake release position.

With conduit 128 in communication with conduit 151, the engine intake manifold will be effective to exhaust pressure from reservoir 112 by way of conduit 124, passageways 123 and 122, past check valve 137, passageway 125, past check valve 138, passageway 126, and branch conduit 127 to conduit 128. At the same time pressure will be exhausted from chamber 120 of the power cylinder device 110 by way of passageway 122, past check valve 137, passageway 125, past check valve 138, passageway 126, and conduits 127 and 128; and from chamber 121 by way of passageway 130, past fluted stem 135, through a plurality of ports in piston-valve 134, past valve 136, passageway 125, past check valve 138, passageway 126, and conduits 127 and 128, it being recalled that valve 131 will be seated in the absence of fluid pressure acting on piston-valve 134, so that the pressure in both chambers 120 and 121 will be equalized at a sub-atmospheric pressure, and the spring 42 will maintain the shoe 35 out of engagement with the road surface, and the piston 118 will occupy a normal or uppermost position, as viewed in the drawing, in which position said brake shoe is out of engagement with the road surface. The pressure in vacuum reservoir 112 will also be at sub-atmospheric pressure.

The conditions immediately above described will be the prevailing conditions when the tractor-trailer vehicle is traveling under normal favorable conditions.

If the operator desires to apply the brakes to the wheels 1, he may do so by depressing foot pedal 14 of the control device 13 to operate said control device to its brake application position in which fluid under pressure will be supplied, by way of conduit 129, to chamber 146 of the selector valve device 111. The compressible resistance of spring 148 is such that a degree of fluid pressure in chamber 146 that would be adequate for causing the brake actuators 6 to apply the wheel brakes, will act through diaphragm 145 to compress said spring and thereby permit the diaphragm to move upwardly, as viewed in the drawing, and carry with it valve 144 to its unseated position. With upward movement of valve 144, and, therefore, in effect, nullification of the opposing force of spring 148, spring 152 will be effective for seating piston-valve 150 to cut off communication of conduit 128 with conduit 151 and with the intake manifold.

With valve 144 unseated, conduit 129 will be in communication with conduit 128 through chamber 146, and fluid under pressure may thus be supplied to the brake actuators 6 for effecting a brake application on the wheels 1, from the fluid pressure supply reservoir (not shown) through the control valve device 13.

The pressure of fluid present in conduits 128 and 127, and therefore in passageway 126 of the pilot valve device 139, will be proportional to the extent to which foot pedal 14 of device 13 is moved, the check valve 138 preventing such pressure from going beyond passageway 126, while spring 142 will be effective to hold valve 141 in its seated position as long as said pressure acting on the side of valve 141 adjacent passageway 126 does not exceed the degree of fluid pressure as effected by movement of said foot pedal 14 within the normal braking range from "Brake Release" position to "Maximum Normal Braking" position, as above described in connection with the embodiment shown in Fig. 5. The check valve 138 and seated valve 141, therefore, prevent any fluid under pressure from reaching the reservoir 112 and chambers 120 and 121, which remain in their sub-atmospheric pressure condition during normal braking operations as effected on the wheels 1.

If, during any time that the tractor-trailer vehicle is traveling on the highway, sideslip of the trailer should become imminent or actually occur either due to braking of the wheels 1 or for any other reason such as unfavorable road conditions, the operator of the vehicle may prevent sideslip or eliminate it, if already in progress, by operating the foot pedal 14 of the control valve device 13 to its "High Pressure" position to effect delivery of fluid at a pressure greater than the maximum normal braking pressure to conduit 128, through the selector valve device 111, as above described. Fluid pressure is thus supplied to the brake actuators 6 to effect brake application on the wheels 1, if such brake aplication is not already in effect. Such pressure in conduit 128, and therefore in conduit 127 and passageway 126 of the pilot valve device 139, will be sufficient to overcome opposing force of spring 142 acting on valve 141 to unseat said valve and become effective over the entire area of diaphragm 143 to maintain spring 142 compressed and valve 141 unseated.

Unseating of valve 141 allows fluid under pressure to bypass check valve 138 by way of passageway 140 and to flow by way of passageway 125 to the piston-valve 134, on which said fluid pressure will act to seat valve 136 and move said piston-valve downwardly, as viewed in the drawing, to unseat valve 131 and thereby place passageway 130 and chamber 121 in communication with atmospheric pressure by way of port 133. It will be recalled that chamber 120 and vacuum reservoir 112, to which said chamber is connected by passageways 122 and 123 and conduit 124, are at sub-atmospheric pressure. Atmospheric pressure in chamber 121, therefore, acting on piston 118 will be effective for moving said piston, the piston follower 119 and the brake shoe 35 downwardly, as viewed in the drawing, against opposing force of spring 42 until said brake shoe is engaged with the road surface, vacum reservoir 112 assuring that there is sufficient sub-atmospheric volume to compensate for volume reduction of chamber 120 as the piston 118 moves downwardly.

Engagement of the brake shoe 35 with the road surface will stabilize the trailer to eliminate any tendency of sideslip where said sideslip has not yet actually occurred but appears to be imminent. In a situation where the trailer is already in a sideslipping motion, engagement of the shoe 35 with the road surface will cause rocking of the power cylinder devices 110 about the axis of the shaft 114, which rocking effects release of the brakes on the wheels 1 through the linkage 55, 54 and the operating shaft 4 in a manner similar to that described in connection with the embodiments as shown in Figs. 1, 2 and 3. After the brakes on wheels 1 have been released, as just described, the brake shoes 35 will be effective for stabilizing the trailer vehicle and bringing it into straight-line travel with the tractor. When the trailer has thus been righted, the power cylinder devices 110 will return to a normal vertical position in which side-slip forces on the linkage 55, 54 and the shaft 4 are removed and the braking force of the brake actuators 6 again are effective to cause reapplication of the brakes in a manner similarly described in connection with the embodiments shown in Figs. 1, 2 and 3.

After the sideslip condition, or the threat of such condition, has been eliminated, the operator of the vehicle may effect a reduction of fluid pressure supply to conduit 128 and brake actuators 6 by reducing manual pressure on the foot pedal 14 of the control device 13 to permit said foot pedal to return to some position within the normal braking range, above described, which reduced pressure acting in the brake actuators 6 will continue to maintain the desired degree of braking effort on the wheels 1 commensurate with the amount of manual pressure maintained on said foot pedal.

Reduction of fluid pressure in conduit 128 and, therefore, pressure acting on diaphragm 143 of the pilot valve device 139, to some degree within the normal braking range or lower, will permit spring 132 to respond to such pressure reduction to reseat valve 141 and thereby cut off further supply of fluid pressure to piston-valve 134 by way of bypass 140. With piston-valve 134 relieved of fluid pressure, spring 132 will be effective to seat valve 131 and thereby close chamber 121 to port 133 and piston 118 to atmospheric pressure, spring 42 then being effective to move brake shoe 35 out of engagement with the road surface.

Of course, the operator of the vehicle, after sideslip correction, may desire to release all braking operation relative to the wheels 1 as well as on the road surface by the shoes 35, in which case he will operate the foot pedal 14 of the control valve device 13 to its "Brake Release" position in which position the entire brake system, including brake actuators 6, the pilot valve device 139, chamber 146 of selector valve device 111, and conduit 129, is relieved of fluid pressure by way of exhaust pipe 15 of the control device 13. In the absence of fluid pressure in chamber 146 of the selector valve device 111, spring 148 becomes effective to reseat valve 144 and unseat valve 150 to open conduit 128 to the engine intake manifold, as above described. With conduit 128 open to the intake manifold, reservoir 112, chamber 120, and chamber 121 will all be reduced again to sub-atmospheric pressure, as above described, and the apparatus will be in condition once more, in the event of occurrence of further sideslip, for correcting such sideslip.

It will be seen, therefore, that the embodiment of the invention as shown in Fig. 7 of the drawing and as immediately above described operates to prevent or correct sideslip of an automatic trailer, but does so by employing atmospheric pressure and by requiring only a minimum amount of fluid under pressure to supplement said atmospheric pressure in operating the apparatus for its intended purpose.

Figure 8:
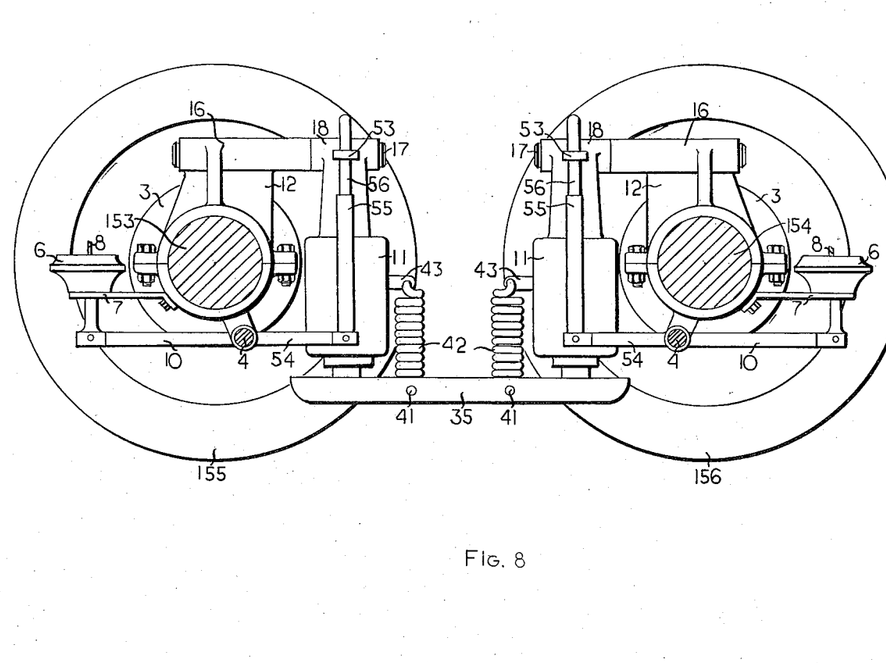
Fig. 8 is an elevational view, partly in section and partly in outline, looking toward the inboard side of the trailer wheels, which view illustrates a method for mounting the apparatus on a multiple axle vehicle.

*Description and operation, Fig. 8*

If the automotive trailer, which is desired to be equipped with the apparatus embodying the invention, is of the multiple axle type, that is, dual axles, for example, Fig. 8 schematically illustrates one method for mounting and arranging the apparatus on such a vehicle.

The numerals 153 and 154 designate a pair of non-rotative axles of an automotive trailer, which axles have rotatably mounted thereon in conventional manner wheels 155 and 156, respectively. Instead of having a pair of power cylinder devices at each end of each of the axles 153 and 154, each end of each of said axles carries only one power cylinder device on the inner sides of said axles relative to each other, so that the two power cylinders carried by the two axles 153 and 154 constitute a pair of operatively cooperating power cylinder devices supporting a single brake shoe 35 between them.

The power cylinder devices, as shown, are similar to those designated by the numeral 11 in Fig. 1. It should be understood, however, that any type of power cylinder devices of those described above in connection with Figs. 1, 6 and 7 may be arranged on the dual-axle vehicle. Since the apparatus, arranged on dual axles in the manner immediately above described, would function in a manner similar to that described in connection with the embodiments of the invention illustrated in Figs. 1, 2, 3, 4, 5, 6 and 7, depending upon which type of set-up is used, it is not deemed essential to an understanding of the invention to repeat a detailed description of the structure and function of the apparatus as illustrated in Fig. 8.

*Summary*

From the above detailed description of various embodiments of the invention, it should be evident that the invention provides generally control apparatus for preventing or correcting sideslip of automotive trailer vehicles, either of the single or multiple axle type, due to unfavorable road conditions or incident to braking.

In each of the embodiments, side-wise forces incident to sideslip of the trailer are exerted on a shoe supported in normally vertical depending relation from the trailer and actuated into ground engaging contact under the control of the operator, such side-wise forces being utilized to oppose the normal braking forces acting to apply the trailer wheel brakes, thereby releasing the wheel brakes and allowing the trailer to cease sideslip and track behind the tractor vehicle.

The invention is illustrated in connection with various types of brake control utilizing air pressure, hydraulic pressure, or vacuum pressures for applying and releasing the brakes on the trailer wheels.

Having now described the invention, what I claim as new and desire to secure by Letters Patent is:

1. A brake control and sideslip inhibiting apparatus for automotive type road vehicles, said apparatus comprising, in combination, actuating means for exerting a braking force on a wheel of the vehicle, road-engageable means movably carried by the vehicle, means for effecting operation of said road-engageable means into and out of engagement with the road surface on which the vehicle travels, said road-engageable means being subject to force while in engagement with the road surface at a time when sideward movement of the vehicle relative to the direction of vehicle travel occurs for transmitting such force into opposing relation with regard to the braking force exerted by the actuating means to thereby effect a reduction in the degree of the braking force thereby exerted on the wheel.

2. A brake control and sideslip inhibiting apparatus for an automotive vehicle having a conventional axle with wheels mounted at each end for rotation thereon, said apparatus comprising, in combination, brake applying means operable to exert a brake applying force for effecting a brake application on said vehicle wheels, a fluid pressure operable cylinder device suspended from the axle and normally occupying a vertical position relative to the road surface and being rockable in a transverse direction relative to the direction of travel of the vehicle, road-engaging means operable by said cylinder device from a raised position out of contact with the road surface to a lowered position in engagement with the road surface, said road-engaging means being so arranged, when in road-engaging contact, as to cause said cylinder device to be rocked in said transverse direction relative to the direction of travel of the vehicle as a result of sideward movement of the vehicle relative to its direction of travel, and means for translating the forces causing said rocking movement of said cylinder device into opposing relation to the braking force exerted by the brake applying means, thereby to automatically relieve the brake application on said wheels.

3. The combination as defined in claim 2 wherein the cylinder device comprises a casing having a pressure chamber, a piston disposed and vertically operable within said casing, and a piston rod extending vertically downwardly from said piston and terminating exteriorly of said casing, to which exterior end of said piston rod the road-engaging member is fastened, said piston being subjectable to fluid pressure supplied to and relieved from said chamber for operating said road-engaging member to its raised and lower positions, respectively.

4. The combination, as defined in claim 2, wherein the cylinder device comprises a casing having a pressure chamber and a hydraulic fluid storage chamber normally in communication with each other, a first piston disposed in said casing and subjectable to pneumatic fluid pressure, a second piston associated with said first piston and axially movable therewith in a vertical direction relative to the road surface, a piston rod extending vertically downwardly from said second piston and terminating exteriorly of said casing, to which exterior end of said piston rod the road-engaging means is fastened, both said pistons normally occupying a raised position, in which position the road-engaging means is out of contact with the road surface, and being operable, in response to pressure of pneumatic fluid acting on said first piston, to a lowered position in which said road-engaging means is moved into contact with the road surface by a certain force as determined by the pressure area of said first piston, and valve means controlled by the pressure of pneumatic fluid as supplied to said first piston, said valve means including a valve for controlling communication between said storage chamber and said pressure chamber, said valve having an unseated position in which unseated position hydraulic fluid may flow from the storage chamber to the pressure chamber, and operable to a seated position, in response to pressure of said pneumatic fluid supplied to said first piston, in which seated position said flow of hydraulic fluid is cut off and a communication is established whereby pneumatic fluid pressure supplied to said first piston is also supplied to said pressure chamber to act on said second piston, through the hydraulic fluid in said pressure chamber, for exerting a force, as determined by the pressure area of said second piston, on the road-engaging means greater than said certain force, as effected by said first piston, for effecting frictional engagement between said road-engaging means and the road surface.

5. The combination, as defined in claim 2, wherein the cylinder device comprises a piston operable within said cylinder device for operating the road-engaging means, one side of said piston being normally subjected to sub-atmospheric pressure while the opposite of the piston is constantly subjected to sub-atmospheric pressure, whereby said piston is operative to occupy a first position in which the road-engaging means is in its raised position, said one side of said piston being subjectable to atmospheric pressure for creating a pressure differential on opposite sides of the piston, whereby said piston is operable to a second position in which the road-engaging means is moved to its lowered position, and valve means effective in one position for opening both sides of said piston to a source of sub-atmospheric pressure and being operable in response to fluid pressure to a different position for closing said one side to sub-atmospheric pressure and opening it to atmospheric pressure.

6. The combination, as defined in claim 3, further characterized by a bracket affixed to the axle adjacent the inboard side of the wheel, an axially rotatable shaft supported by said bracket in a transverse position relative to and above the axle and in parallel relation to the road surface, said cylinder devices being vertically suspended from opposite ends of said shaft, respectively, and being secured thereto so as to be rockable in unison through said shaft.

7. The combination as defined in claim 3 wherein each cylinder device comprises a casing having a pressure chamber and a hydraulic fluid storage chamber normally in communication with each other, a first piston disposed in said casing and having a certain effective pressure area, a second piston associated with and having a greater effective pressure area than said first piston and axially movable therewith in a vertical direction relative to the road surface, said second piston being subjectable to road surface, said second piston being subjectable to pneumatic fluid pressure acting through hydraulic fluid in said pressure chamber, a piston rod extending vertically downwardly from said second piston and terminating exteriorly of said casing, to which exterior end of said piston rod the road-engaging member is fastened, both said pistons normally occupying a raised position, in which position the road-engaging member is out of contact with the road surface, and being operable in response to pressure of pneumatic fluid acting on said first piston, as controlled and effected by the operator's control means, to a lowered position in which said road-engaging member is moved into contact with the road surface by a certain force as determined by the pressure area of said first piston, and valve means controlled by the pressure of pneumatic fluid as supplied to said first piston, said valve means including a valve for controlling communication between said storage chamber and said pressure chamber, said valve having an unseated position in which unseated position hydraulic fluid may flow from the storage chamber to the pressure chamber, and operable to a seated position, in response to pressure of said pneumatic fluid supplied to said first piston, in which seated position flow of hydraulic fluid from said storage chamber to said pressure chamber is cut off and a communication from said operator's control means to said pressure chamber is established whereby supply of pneumatic fluid under pressure to said pressure chamber is effected by said operator's control means and acts on said second piston, through the hydraulic fluid in said pressure chamber, for exerting a force, as determined by the pressure area of said second piston on the road-engaging means greater than said certain force, as effected by said first piston, for effecting frictional engagement between said road-engaging member and the road surface.

8. A brake control and sideslip inhibiting apparatus for an automotive vehicle having a conventional axle with wheels mounted at each end for rotation thereon, said apparatus comprising, in combination, brake applying means operable to exert a brake applying force for effecting a brake application on said wheels, a pair of fluid pressure operable cylinder devices suspended from said axle in a straddling fashion relative to the axle adjacent the inboard side of the wheel, said pair of cylinder devices being so arranged as to have one cylinder device suspended on each side of the axle normally in a vertical position relative to the road surface and being rockable in a transverse direction relative to the direction of travel of the vehicle, a road-engaging member suspended from said pair of cylinder devices, said road-engaging member extending underneath the axle parallel to the axis of the vehicle between the two cylinder devices comprising the paid, said road-engaging member normally occupying a parallel and raised position relative to the road surface, when said cylinder devices are relieved of fluid pressure, in which normal position clearance is provided between the road-engaging member and the road surface, and being operable by said cylinder devices, when supplied with fluid pressure, to a lowered position in which the member engages the road surface to provide frictional contact therewith, said road-engaging member being effective in said lowered position and upon occurrence of any sideward movement of the vehicle relative to its normal direction of travel due to sideslip, for causing said cylinder devices, as a result of such sideward movement, to be rocked in a transverse direction relative to the direction of travel of the vehicle, operator's control means for effecting supply of fluid pressure from a source to said cylinder devices and release of such pressure from the cylinder devices, and mechanical linkage operable by said rocking movement of said cylinder devices for translating the forces produced by said sideward movement of the vehicle into opposing relation to the braking force exerted by the brake applying means, thereby to automatically relieve the brake application on said wheels.

9. A brake control and sideslip inhibiting apparatus for an automotive vehicle having a conventional axle with wheels mounted at each end for rotation thereon, said apparatus comprising, in combination, brake applying means operable in response to fluid pressure to exert a brake applying force for effecting a brake application on said wheels, manually operable valve means having a release position in which said brake applying means is relieved of fluid pressure and operable to an application position in which fluid pressure supply to said brake applying means is effected, road engaging means having a raised position out of contact with the road surface and being operable to a lowered position in engagement with the road surface, a cylinder device for supporting and operating said road-engaging means, said cylinder device being suspended from said axle normally in a vertical position relative to the road surface and being rockable in a transverse direction relative to the direction of travel of the vehicle, said cylinder device also being operative, when relieved of fluid pressure, to move said road-engaging means to its raised position and being operable in response to fluid pressure to operate said road-engaging means to its lowered position, said road-engaging means being so arranged, when in said lowered position, as to cause said cylinder device to be rocked in said transverse direction upon occurrence of sideward movement or sideslip of the vehicle, operator's control valve means having one position in which said cylinder device is relieved of fluid pressure and being manually operable to a different position in which said cylinder device is supplied with fluid pressure, and means interlocked with said cylinder device and said brake applying means for translating the forces causing said sideward movement of the vehicle and rocking movement of said cylinder device into opposing relation to the braking force exerted by the brake applying means, thereby to automatically relieve the brake application on said wheels.

10. A brake control and sideslip inhibiting apparatus for an automotive vehicle having a conventional axle with wheels mounted at each end for rotation thereon, said apparatus comprising, in combination, brake applying means operable in response to fluid pressure to exert a brake applying force for effecting a brake application on said wheels, manually operable valve means having a release position in which said brake applying means is relieved of fluid pressure and operable to an application position in which fluid pressure supply to said brake applying means is effected, road-engaging means having a raised position out of contact with the road surface and being operable to a lowered position in engagement with the road surface, a cylinder device for supporting and operating said road-engaging means, said cylinder device being suspended from said axle normally in a vertical position relative to the road surface and being rockable in a transverse direction relative to the direction of travel of the vehicle, said cylinder device also being operative, when relieved of fluid pressure, to move said road-engaging means to its raised position and being operable in response to fluid pressure to operate said road-engaging means to its lowered position, said road-engaging means being so arranged, when in said lowered position, as to cause said cylinder device to be rocked in said transverse direction upon occurrence of sideward movement or sideslip of the vehicle, operator's control valve means having one position in which said cylinder device is relieved of fluid pressure and being manually operable to a different position for effecting supply of fluid pressure to said cylinder device when said first mentioned manually operable valve means is in its application position, and means interlocked with said cylinder device and said brake applying means for translating the forces causing said sideward movement of the vehicle and rocking movement of said cylinder device into opposing relation to the braking force exerted by the brake applying means, thereby to automatically relieve the brake application on said wheels.

11. A brake control and sideslip inhibiting apparatus for an automotive vehicle having a conventional axle with wheels mounted at each end for rotation thereon, said apparatus comprising, in combination, brake applying means operable in response to fluid pressure to exert a brake applying force for effecting a brake application on said wheels, manually operable valve means having a release position in which said brake applying means is relieved of fluid pressure and operable from said release position through a brake applying range for effecting supply of fluid at various desired pressures from a source of fluid under pressure to said brake applying means, road-engaging means having a raised position out of contact with the road surface and being operable to a lowered position in engagement with the road surface, a cylinder device for supporting and operating said road-engaging means, said cylinder device being suspended from said axle normally in a vertical position relative to the road surface and being rockable in a transverse direction relative to the direction of travel of the vehicle, said cylinder device also being operative, when relieved of fluid pressure, to move said road-engaging means to its raised position and being operable in response to fluid pressure to operate said road-engaging means to its lowered position, said road-engaging means being so arranged, when in said lowered position, as to cause said cylinder device to be rocked in said transverse direction upon occurrence of sideward movement or sideslip of the vehicle, second valve means having a normal position in which said cylinder device is relieved of fluid pressure and being operable in response to fluid pressure supplied to said brake applying means by said manually operable valve means at a pressure greater than a certain degree for automatically effecting supply of fluid pressure to said cylinder device, and means interlocked with said cylinder device and said brake applying means for translating the forces causing said sideward movement of the vehicle and rocking movement of said cylinder device into opposing relation to the braking force exerted by the brake applying means, thereby to automatically relieve the brake application on said wheels.

12. A braking apparatus for automotive type road vehicles comprising, in combination, a road-engaging member normally biased to a raised position out of contact with the road surface and operable to a lowered position in frictional engagement with the road surface for causing a retarding effect on the vehicle, biasing means for biasing said road-engaging member toward its raised position, a cylinder device for operating said road-engaging member and comprising a casing having a pressure chamber and a hydraulic fluid storage chamber normally in communication with each other, a first piston disposed in said casing, a second piston associated with said first piston and axially movable therewith in a vertical direction relative to the road surface, said second piston being subjectable to pneumatic fluid pressure acting through hydraulic fluid in said pressure chamber, a piston rod extending vertically downwardly from said second piston and terminating exteriorly of said casing, to which exterior end of said piston rod the road-engaging member is fastened, both said pistons normally occupying a first position in which the road-engaging member is in its raised position, and being operable, in response to pressure of pneumatic fluid on said first piston, to a second position in which said road-engaging means is moved to its lowered position against the opposing force of said biasing means, valve means controlled by the pressure of pneumatic fluid acting on said first piston, said valve means including a valve for controlling communication between said storage chamber and said pressure chamber, said valve having an unseated position in which unseated position hydraulic fluid may flow from the storage chamber to the pressure chamber, and operable, in response to said pneumatic fluid pressure, to a seated position in which said flow of hydraulic fluid between said chambers is cut off and a communication leading to said pressure chamber is established by which pneumatic fluid pressure supplied to said first piston is also supplied to said pressure chamber to act on said second piston through said hydraulic fluid, and operator's control means for effecting supply of pneumatic fluid pressure to said first piston.

13. A braking apparatus for automotive type road vehicles comprising, in combination, a road-engaging member normally biased to a raised position out of contact with the road surface and operable to a lowered position in frictional engagement with the road surface for producing a retarding effect on the vehicle, biasing means for biasing said road-engaging member toward its raised position, a source of sub-atmospheric pressure, a cylinder device for operating said road-engaging member, a piston operable within said cylinder device and having a piston rod associated therewith, to which piston rod the road-engaging member is fastened for movement therewith as effected by the piston, said piston being normally subjected on opposite sides thereof to sub-atmospheric pressure from said source so that said biasing means is effective, through said road-engaging member and said piston rod, for moving said piston to a first position in which said road-engaging member is in its raised position, said piston being operable, upon admission of atmospheric pressure to one side thereof, to a second position in which said road-engaging means is operated, against opposing force of said biasing means, to its lowered position, fluid pressure operable valve means having one position, when relieved of fluid pressure, in which one position said one side of said piston is closed to atmospheric pressure and opened to sub-atmospheric pressure from said source and being operable in response to fluid pressure for closing said one side of said piston to sub-atmospheric pressure and opening it to atmospheric pressure, and operator's control means for effecting supply and release of fluid pressure to and from, respectively, said valve means.

14. A brake control and sideslip inhibiting apparatus for an automotive vehicle having a conventional axle with wheels mounted at each end for rotation thereon, said apparatus comprising in combination, brake applying means operable in response to fluid pressure to exert a brake applying force for effecting a brake application on said wheels, manually operable valve means for effecting supply of fluid at varying pressures to said brake applying means, road-engaging means having a raised position out of contact with the road surface and being operable to a lowered position in friction contact with the road surface, a cylinder device for supporting and operating said road-engaging means, said cylinder device being suspended from said axle normally in a vertical position relative to the road surface and being rockable in a transverse direction relative to the direction of travel of the vehicle, said cylinder device also including a piston for operating said road-engaging means, which piston is normally subjected on both sides to equalized sub-atmospheric pressures for maintaining said road-engaging means in its raised position and is operable, upon admission of atmospheric pressure to one side, for moving said road-engaging means to its lowered position, in which lowered position said road-engaging means is effective to cause said cylinder device to be rocked in said transverse direction upon occurrence of sideslip or sideward movement of the vehicle relative to its direction of travel, pilot valve means subject to said fluid pressure supplied to said brake applying means and having one postion, when said fluid pressure is less than a certain degree, in which position both sides of said piston is connected to a source of sub-atmospheric pressure, and being operable to a different position in response to said fluid pressure at a degree greater than said certain degree, in which different position said one side of said piston is connected to atmospheric pressure, and means associated with said cylinder device and said brake applying means for translating the forces causing said sideward movement of the vehicle and, therefore, said rocking movement of the cylinder device into opposing relation to the braking force exerted by the brake applying means, thereby to automatically relieve the brake application on said wheels.

15. A brake control and sideslip inhibiting apparatus for an automotive vehicle having a conventional axle with wheels mounted at each end for rotation thereon, said apparatus comprising, in combination, brake applying means operable in response to fluid pressure to exert a brake applying force for effecting a brake application on said wheels, manually operable valve means having a release position in which said brake applying means is relieved of fluid pressure and operable through a brake applying range for effecting supply of fluid at various desired pressures from a source of fluid under pressure to said brake applying means, conduit means providing for flow of fluid under pressure between said manually operable valve means and said brake applying means, a selector valve device interposed in said conduit means and effective in a normal position, in the absence of fluid pressure in said conduit means, for establishing a communication between said conduit means and a source of sub-atmospheric pressure, said selector valve device being operable in response to fluid pressure in said conduit means, as effected by said manually operable valve means, to close said communication, a reservoir providing a volume to be maintained at sub-atmospheric pressure by being connected to said conduit means, a one-way check valve between said conduit means and said reservoir effective for opening said volume to said conduit means when said communication to said source of sub-atmospheric pressure is open and for closing said volume to said conduit means when the latter is charged with fluid under pressure by the manually operable valve means, a cylinder device suspended from said axle normally in a vertical position relative to the road surface and being rockable in a transverse direction relative to the direction of travel of the vehicle, road-engaging means operable from a raised position out of contact with the road surface to a lowered position in engagement with the road surface, said road-engaging means being so arranged, when in its lowered position, as to cause said cylinder device to be rocked in said transverse direction upon occurrence of sideward movement of the vehicle due to sideslip thereof, yieldable biasing means for said road-engaging means, a piston associated with said cylinder device for operating said road engaging means, one side of said piston being constantly subjected to sub-atmospheric pressure in said volume while the opposite side may be subjected to either sub-atmospheric pressure in said conduit means when the latter is in communication with said source of sub-atmospheric pressure, whereby said biasing means is effective for moving said piston to one position in which said road-engaging means is in its raised position or said opposite side of said piston may be subjected to atmospheric pressure for creating a pressure differential on the opposite sides of the piston for effecting movement thereof to a different position for operating said road-engaging means to its lowered position, second valve means operative responsively to sub-atmospheric pressure in said conduit means for opening said opposite side of said piston to said sub-atmospheric pressure and operable in response to fluid under pressure for opening said opposite side of said piston to atmospheric pressure, a second one-way check valve between said second valve means and said conduit means effective for opening said second valve means to said conduit means when the latter is connected to sub-atmospheric pressure and for closing said second valve means to said conduit means when the latter is charged with fluid under pressure by the manually operable valve means, pilot valve means for controlling a by-passing communication between said conduit means and said second valve means, said pilot valve means normally occupying a seated position in which said bypassing communication is closed and being operable in response to fluid in said conduit means at a pressure greater than a certain pressure, to an unseated position in which said bypassing communication is opened whereby said second valve means is supplied with fluid pressure, and means for translating the forces causing said sideward movement of said vehicle into opposing relation to the braking force exerted by the brake applying means, thereby to automatically relieve the brake application on said wheels.

16. A brake control and sideslip inhibiting apparatus for an automotive vehicle of the type having dual axles in tandem arrangement, each of said axles having wheels mounted in conventional manner at each end for rotation thereon, said apparatus comprising, in combination, brake applying means operable to exert a brake applying force for effecting a brake application on said wheels, a bracket affixed to each axle adjacent the inboard sides of the wheels mounted on corresponding ends of said axles, a cylinder device suspended between the two axles from each of said brackets normally in a vertical position relative to road surface and being rockable in a transverse direction relative to the direction of travel of the vehicle, a road-engaging member suspended from and extending between said cylinder devices and being operable by said cylinder devices from a raised position out of contact with the road surface to a lowered position in engagement with the road surface, said road-engaging means being so arranged, when in said lowered position, as to cause said cylinder devices to be rocked in said transverse direction upon occurrence of sideward movement of the vehicle due to sideslip, and means interlocked with said brake applying means and said cylinder devices for translating the forces causing said sideward movement of the vehicle and rocking of the cylinder devices into opposing relation to the braking force exerted by the brake applying means, thereby to automatically relieve the brake application on said wheels.

No references cited.